United States Patent
Kopikare et al.

(10) Patent No.: US 8,583,190 B1
(45) Date of Patent: Nov. 12, 2013

(54) POWER SAVING TECHNIQUE FOR A WIRELESS DEVICE

(75) Inventors: Rahul Kopikare, Mumbai (IN);
Sandesh Goel, Pune (IN); Pierre Vandwalle, Menlo Park, CA (US);
Partho Mishra, Cupertino, CA (US)

(73) Assignee: Marvell International Ltd. (BM)

( * ) Notice: Subject to any disclaimer, the term of this patent is extended or adjusted under 35 U.S.C. 154(b) by 1045 days.

(21) Appl. No.: 12/357,915

(22) Filed: Jan. 22, 2009

Related U.S. Application Data

(63) Continuation-in-part of application No. 12/123,281, filed on May 19, 2008, now Pat. No. 8,095,091.

(60) Provisional application No. 60/938,816, filed on May 18, 2007.

(51) Int. Cl.
*H04B 1/38* (2006.01)
*H04B 1/00* (2006.01)

(52) U.S. Cl.
USPC ............. 455/574; 455/127.5; 455/343.1

(58) Field of Classification Search
USPC ........... 455/574, 127.5, 343.1, 343.2, 343.4, 455/514, 67.11, 556.1, 230, 231
See application file for complete search history.

(56) References Cited

U.S. PATENT DOCUMENTS

| | | | | |
|---|---|---|---|---|
| 6,212,224 | B1 * | 4/2001 | Cammarota et al. | 375/219 |
| 6,463,307 | B1 | 10/2002 | Larsson et al. | |
| 7,242,971 | B2 * | 7/2007 | Park | 455/574 |
| 7,414,560 | B2 * | 8/2008 | Chen et al. | 341/144 |
| 7,580,634 | B2 * | 8/2009 | Takeuchi et al. | 398/38 |
| 7,693,241 | B2 * | 4/2010 | Sheshadri et al. | 375/348 |
| 8,019,382 | B2 * | 9/2011 | Rush et al. | 455/553.1 |
| 2008/0285690 | A1 * | 11/2008 | Kwon et al. | 375/345 |
| 2009/0279897 | A1 * | 11/2009 | Takeuchi et al. | 398/137 |
| 2010/0125681 | A1 * | 5/2010 | Patel | 710/14 |
| 2010/0246459 | A1 | 9/2010 | Ding et al. | |
| 2011/0239256 | A1 * | 9/2011 | Gholmieh | 725/62 |

OTHER PUBLICATIONS

U.S. Appl. No. 10/962,376, filed Oct. 8, 2004, M. Kopikare.

* cited by examiner

*Primary Examiner* — Pablo Tran

(57) ABSTRACT

A system and method are disclosed for decreasing the amount of power consumed by a wireless signal receiver in a wireless device. Received data is communicated from the receiver to a play-out buffer in communication with a media play-out device. The level of data in the play-out buffer increases when received data is written to the buffer, and the level of data decreases when data is read from the buffer. If the level of data is above a first watermark level, the receiver is transitioned to a sleep mode while data is read from the buffer. When the level of data in the buffer falls below a second watermark level, the receiver is transitioned back to an active mode to receive data. The device communicates status messages (whether the receiver is asleep or active) to the transmitting device so that the transmitting device stops transmitting data when the receiver is in sleep mode, and transmits data when the receiver is in the active mode.

23 Claims, 4 Drawing Sheets

POWER SAVING TECHNIQUE FOR A WIRELESS DEVICE

RELATED APPLICATION

This application is a continuation-in-part and claims the benefit of U.S. application Ser. No. 12/123,281, filed on May 19, 2008, which in turn claims priority to U.S. Provisional Application No. 60/938,816, filed on May 18, 2007, both of which are incorporated herein by reference. This application is related to U.S. application Ser. No. 12/357,926, filed on Jan. 22, 2009.

BACKGROUND

1. Technical Field

The present disclosure relates to the field of wireless devices, and more particularly to decreasing the amount of power used by components of such devices.

2. Related Art

Wireless devices such as lap-top computers, personal digital assistants, multi-media Internet enabled phones, portable media players, and other devices include components, systems, circuits, and/or other hardware that consume device power. The power may be provided by a device battery, as an example. The per-charge life of the battery is dependent upon several factors, including the type and amount of hardware that draws power from the battery, the type and amount of user activity of the device, and the amount of power consumed by components of the device in standby mode. The per-charge life of the battery is considered an important feature and affects a user's level of satisfaction with the device. Thus, maximizing the per-charge battery life of a wireless device is desirable. More generally, conserving and/or reducing the amount of power consumed by wireless devices, regardless of the source of device power, may reduce the cost of device operation, may prolong the life of the device, may lead to an increase in user satisfaction, and/or may have other benefits.

BRIEF SUMMARY

The following embodiments relate to systems and methods for reducing the amount of power consumed by a device's wireless signal receiver. The wireless signal receiver communicates received data (e.g., media data) to a forwarding buffer (e.g., a play-out buffer) in communication with a device (e.g., a media play-out device). If the peak rate at which the forwarding buffer can forward data is lower than the peak rate at which the forwarding buffer receives data, the wireless signal receiver may be deactivated for time intervals. Deactivating the wireless signal receiver for time intervals may reduce the amount of power consumed by the device.

Using media data as an example, if the level of media data in a play-out buffer is above a first, higher level, the receiver is deactivated. The media data continues to be read out of the play-out buffer by a play-out device while the receiver is deactivated. When the level of media data in the play-out buffer falls below a second, lower level, the receiver is re-activated to continue to receive media data and communicate the media data to the play-out buffer.

In an embodiment, an apparatus comprises a wireless signal receiver and a processor. The wireless signal receiver communicates data to a memory. The processor determines whether to transition the wireless signal receiver to a power saving mode or to an active mode based on the level of data buffered in the memory. The processor may deactivate the wireless signal receiver if the level of data buffered in the memory reaches a first threshold, and activate the wireless signal receiver if the level of data buffered in the memory reaches a second threshold. Preferably, the processor and the wireless signal receiver comprise a receiver circuit, and the receiver circuit communicates a signal to a transmitting device indicating whether the transmitting device is to stop transmitting data signals.

The apparatus may also include a media play-out device to read media data from the memory. The level of data buffered in the memory will decrease as media data is read from the memory while the wireless signal receiver is in the power saving mode. The processor activates the wireless signal receiver to the active mode when the level of data buffered in the memory reaches a first threshold. The level of data buffered in the memory will increase as media data is written to the memory while the wireless signal receiver is in the active mode The processor transitions the wireless signal receiver to the power saving mode when the level of data buffered in the memory reaches a second threshold. The processor may monitor the level of data buffered in the memory and communicate a first signal and a second signal if the level of data reaches a first threshold. The first signal corresponds to a first message to a transmitting device to stop transmitting data signals for receipt by the wireless signal receiver, and the second signal causes the wireless signal receiver to transition to the power saving mode. The processor may also communicate a third and a fourth signal if the level of data reaches a second threshold. The third signal causes the wireless signal receiver to transition to the active mode, and the fourth signal corresponds to a second message to the transmitting device to resume transmitting data signals for receipt by the wireless signal receiver. The receiver circuit, the memory, and a wireless local area network (WLAN) circuit may all comprise an application specific integrated circuit (ASIC), as an example.

A method comprises communicating data to a memory and determining whether to transition a wireless signal receiver between a power saving mode and an active mode based on the level of data buffered in the memory. The method may also include deactivating the wireless signal receiver if the level of data buffered in the memory reaches a first threshold, and activating the wireless signal receiver if the level of data buffered in the memory reaches a second threshold. A signal may be communicated to a transmitting device to indicate whether the transmitting device is to stop transmitting data signals for receipt by the wireless signal receiver.

The method may further include one or more of the following: reading media data from the memory to decrease the level of data buffered in the memory; activating the wireless signal receiver to the active mode when the level of data buffered in the memory reaches a first threshold; writing media data to the memory to increase the level of data buffered in the memory; transitioning the wireless signal receiver to the power saving mode when the level of data buffered in the memory reaches a second threshold; monitoring the level of data buffered in the memory; and communicating a first and a second signal if the level of data reaches a first threshold. The first signal may correspond to a first message to a transmitting device to stop transmitting data signals for receipt by the wireless signal receiver. The second signal may transition the wireless signal receiver to the power saving mode.

The method may also include communicating a third and a fourth signal if the level of data reaches a second threshold, wherein the third signal transitions the wireless signal receiver to the active mode, and the fourth signal corresponds to a second message to the transmitting device to resume transmitting data signals for receipt by the wireless signal receiver.

An apparatus comprises one or more of the following: means for communicating data to a memory; means for determining whether to transition a wireless signal receiver to a power saving mode or to an active mode based on a level of data buffered in the memory; means for deactivating the wireless signal receiver if the level of data buffered in the memory reaches a first threshold; means for activating the wireless signal receiver if the level of data buffered in the memory reaches a second threshold; means for communicating a signal to a transmitting device indicating whether the transmitting device is to stop transmitting data signals for receipt by the wireless signal receiver; means for reading media data from the memory to decrease the level of data buffered in the memory; means for activating the wireless signal receiver to the active mode when the level of data buffered in the memory reaches a first threshold; means for writing media data to the memory to increase the level of data buffered in the memory; means for transitioning the wireless signal receiver to the power saving mode when the level of data buffered in the memory reaches a second threshold; means for monitoring the level of data buffered in the memory; means for communicating a first and a second signal if the level of data reaches a first threshold, wherein the first signal corresponds to a first message to a transmitting device to stop transmitting data signals for receipt by the wireless signal receiver, and the second signal transitions the wireless signal receiver to the power saving mode; and means for communicating a third and a fourth signal if the level of data is below a second threshold, wherein the third signal transitions the wireless signal receiver to the active mode, and the fourth signal corresponds to a second message to the transmitting device to resume transmitting data signals for receipt by the wireless signal receiver.

A computer readable storage medium has processor executable instructions to: communicate data from a wireless signal receiver to a memory; determine whether to transition the wireless signal receiver to a power saving mode or to an active mode based on a level of data buffered in the memory; deactivate the wireless signal receiver if the level of data buffered in the memory reaches a first threshold; activate the wireless signal receiver if the level of data buffered in the memory reaches a second threshold; communicate a signal to a transmitting device indicating whether the transmitting device is to stop transmitting data signals; read media data from the memory; activate the wireless signal receiver to the active mode when the level of data buffered in the memory reaches a first threshold; write media data to the memory; transition the wireless signal receiver to the power saving mode when the level of data buffered in the memory reaches a second threshold; monitor the level of data buffered in the memory; transmit a signal to the wireless data transmitter to transmit a message to a transmitting device to stop transmitting data signals for receipt by the wireless signal receiver; transition the wireless signal receiver to the power saving mode; transition the wireless signal receiver to the active mode; and/or instruct the transmitting device to resume transmitting data signals for receipt by the wireless signal receiver.

An apparatus comprises a wireless signal receiver and a receiver circuit. The receiver circuit transitions the wireless signal receiver between a first mode and a second mode. In the first mode the receiver circuit enables the wireless receiver to receive data signals and communicate received data to a memory. In the second mode the receiver circuit disables the wireless receiver to reduce power consumption, monitors the level of data in the memory, and transitions the wireless signal receiver back to the first mode if the level of data in the memory is less than a first threshold. The receiver circuit may also transition the wireless signal receiver to the second mode if the level of data in the memory is greater than a second threshold and/or communicate a signal to a transmitting device, the signal indicating whether the wireless signal receiver is able to receive a data signal. The received data may include media data.

A method comprises determining a data level in a memory and enabling and disabling a wireless signal receiver. When enabled, the wireless signal receiver receives data signals and communicates received data to the memory if the data level is less than a first threshold. The wireless signal receiver is disabled if the data level is greater than a second threshold. The method may also include communicating a signal to a transmitting device, the signal indicating whether the wireless signal receiver is able to receive a data signal.

An apparatus comprises one or more of the following: means for determining a data level in a memory; means for enabling a wireless signal receiver to receive data signals and communicate received data to the memory if the data level is less than a first threshold; means for disabling the wireless signal receiver if the data level is greater than a second threshold; and means for communicating a signal to a transmitting device, the signal indicating whether the wireless signal receiver is able to receive a data signal.

A computer readable storage medium has processor executable instructions to: transition a wireless signal receiver between a first mode and a second mode, wherein in the first mode the receiver circuit enables the wireless receiver to receive data signals and communicate received data to a memory, and in the second mode the receiver circuit disables the wireless receiver to reduce power consumption; monitor the level of data in the memory; transition the wireless signal receiver back to the first mode if the level of data in the memory is less than a first threshold; transition the wireless signal receiver to the second mode if the level of data in the memory is greater than a second threshold; and communicate a signal to a transmitting device, the signal indicating whether the wireless signal receiver is able to receive a data signal.

An apparatus comprises a memory in communication with a wireless signal receiver. The wireless signal receiver transitions to a power saving mode if a data level in the memory is above a first threshold, and transitions to an active mode if the data level is below a second threshold. The first threshold is greater than the second threshold. A processor may transition the wireless signal receiver between the power saving mode and the active mode based on the data level.

A method comprises transitioning a wireless signal receiver to a power saving mode if a data level in a memory is above a first threshold, and to an active mode if the data level is below a second threshold. The first threshold is greater than the second threshold.

An apparatus comprises one or more of the following: means for transitioning a wireless signal receiver to a power saving mode if a data level in a memory is above a first threshold, and to an active mode if the data level is below a second threshold.

A computer readable storage medium has processor executable instructions to: transition a wireless signal receiver to a power saving mode if a data level in a memory is above a first threshold, and transition the wireless signal receiver to an active mode if the data level is below a second threshold; and/or transition the wireless signal receiver between the power saving mode and the active mode based on the data level.

Other systems, methods, and features of the invention will be, or will become, apparent to one with skill in the art upon examination of the following figures and detailed description. It is intended that all such additional systems, methods, features and advantages be included within this description, be within the scope of the invention, and be protected by the following claims.

The embodiments will now be described with reference to the attached drawings.

DETAILED DESCRIPTION

Figure 1:
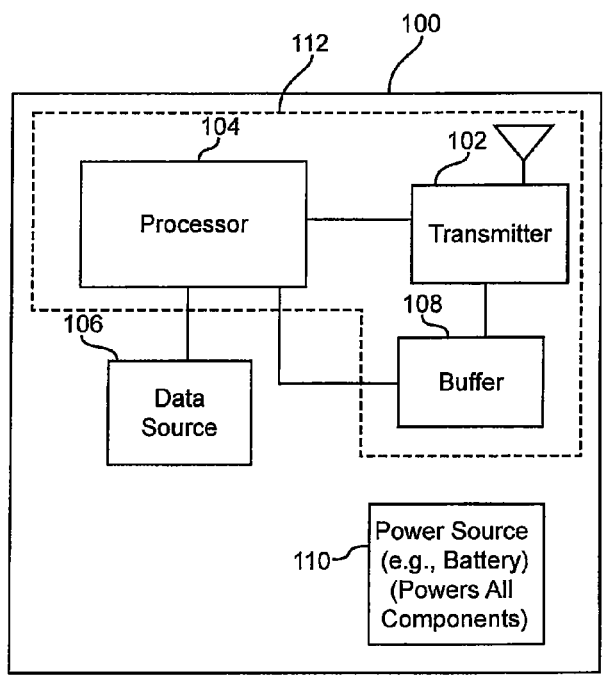
FIG. 1 illustrates a wireless device having a transmission circuit that deactivates a data signal transmitter while aggregating data packets in a buffer, according to a disclosed embodiment.

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

The embodiments below relate to systems and methods for decreasing the amount of power used by a data signal transmitter and/or a wireless signal receiver in a wireless device. On the data signal transmitter side, power usage by the transmitter is reduced when transmitting media (audio and/or visual) data or any other type of data received from a source that provides data at a consistent rate. A transmission circuit, such as a WLAN interface chip or other application specific integrated circuit, is configured to deactivate the transmitter for a deactivation interval and aggregate the media data (or other consistent-rate data) in a buffer while the transmitter is deactivated. At the end of the deactivation interval, the transmitter is activated and the aggregated data packets are transmitted. The transmitter may be repetitively deactivated and activated for transmitting aggregated data packets. The deactivation interval may be based on the data sampling rate, the transmission rate of the transmitter, the capacity of the buffer, and/or other factors. Because the transmitter is deactivated in intervals, the battery life, for example, of the device may be increased without affecting the performance of the device.

On the receiver side, power usage by the wireless signal receiver is reduced. Received data is communicated from the receiver to a play-out buffer in communication with a media play-out device. The level of data in the play-out buffer increases when received data is written to the buffer, and the level of data decreases when data is read from the buffer. If the level of data is above a first level, the receiver is transitioned to a sleep mode while data is read from the buffer. When the level of data in the buffer falls below a second (lower) level, the receiver is transitioned back to an active mode to receive data. The receiving device communicates status messages (whether the receiver will be entering sleep mode or is in the active mode) to the transmitting device so that the transmitting device stops transmitting data signals when the receiver is in sleep mode and transmits data signals when the receiver is in active mode. Because the receiver transitions to sleep mode for periods of time while there is data in the play-out buffer, the battery life, for example, of the device having the receiver may be increased without affecting media playback.

The power saving technique on the receiver side is not limited in application to media data and play-out buffers. The technique is applicable to any wireless signal receiver that communicates received data to a forwarding buffer. If the peak rate that the forwarding buffer forwards data is lower than the peak rate at which the forwarding buffer receives data from a wireless signal receiver, the wireless signal receiver may transition to sleep mode for time intervals while the forwarding buffer forwards data.

Turning first to systems and methods for decreasing the amount of power used by a data signal transmitter, FIG. 1 illustrates a wireless device 100 having a transmission circuit 112 that deactivates a data transmitter 102 while aggregating data packets in a buffer 108. The device 100 may be any wireless device such as a lap-top computer, personal digital assistant, multi-media Internet enabled phone, portable media player, a device operable in a wireless local area network (WLAN) or other network, or any other device having a data transmitter 102 and a power source 110. The transmission circuit 112 may be a WLAN interface chip, an application specific integrated circuit, or other circuit or system having or in communication with a data transmitter 102, as examples.

In the illustrated embodiment, the transmission circuit 112 includes a processor 104 for activating and deactivating the data transmitter 102 in intervals. The processor 104 is in communication with a data source 106. The data source 106 may be any type of data source capable of providing data at a consistent rate. For example, the data source 106 may be a data communication device, a data storage device, a read-only memory (ROM), a random access memory (RAM), a memory card, a Flash memory, or other memory. The data provided by the data source 106 may be, by way of examples, media data such as audio data, visual data, audio-visual data, or any other type of data.

The device 100 may include a user interface (not shown) that receives user input and responsively communicates a transmit instruction signal to the processor 104. The transmit instruction signal indicates that data is to be retrieved from the data source 106 and transmitted. In response, in the illustrated embodiment the processor 104 reads the data from the data source 106, forms data packets for wireless transmission, and communicates the data packets to a buffer 108 in communication with the data transmitter 102. The buffer 108 may be any type of memory or data storage device. Hereinafter, the data packets will be referred to as media data packets. However, it is understood that the data packets may include any type of consistent-rate data.

The processor 104 deactivates the data transmitter 102 for a deactivation interval $T_f$. Deactivation refers to either completely or partially disabling the data transmitter 102 so that it draws less power from the power source 110. During the deactivation interval $T_f$, the processor 104 communicates the media data packets to the buffer 108. The media data packets aggregate in the buffer 108 during the deactivation interval $T_I$. At the end of the deactivation interval $T_I$, the processor 104 activates the data transmitter 102. The data transmitter 102 receives the aggregate of media data packets from the buffer 108 and transmits the aggregate over a wireless network. Transmission circuitry 112 may be configured to transmit data over any type of wireless network, such as a Wi-Fi or other network based on IEEE 802.11 or other standard, as examples.

As an example, the data transmitter 102 may be deactivated for an interval $T_I$ if the media data packets that are stored in the buffer 108 are read out of the buffer 108 (and transmitted) at a rate that is greater than the sampling rate of the data received from the data source 106. The rate that the media data packets are read from the buffer 108 and transmitted is dependent on the bandwidth of the network. For example, if the data transmitter 102 is a Wi-Fi device operating according to the IEEE 802.11g standard, it may transmit data at 25 Mbps. The bit-per-second data rate of the data source 106 is based on the media sample rate. Thus, if the data source 106 were to provide a 64-byte audio sample every ten milliseconds, the bit-per-second data rate of the audio data is 51.2 kbps. In this example, the media data packets are read out of the buffer 108 and transmitted at a much higher rate than the sampling rate of the audio signal (i.e., 25 Mbps>51.2 kbps). Because the media data rate is consistent and will not exceed the rate of data transmission, a deactivation interval $T_I$ may be determined for the data transmitter 102.

The deactivation interval $T_1$ may be communicated to the processor 104 as a predetermined value and/or the processor 104 may be programmed to determine the deactivation interval $T_1$. Whether predetermined or programmable, the deactivation interval $T_1$ is greater than the sum of all transition and processing periods required for transitioning the data transmitter 102 from an active state to a deactivated state, and back to an active state. By way of example, a data transmitter 102 may require 2 ms. to transition from an active to a deactivated state, and 2 ms. to transition from the deactivated state back to an active state. Also, the processor 104 may utilize an additional 1.5 ms. to execute instructions associated with initiating deactivation steps and communicating a deactivation signal to the data transmitter 102. In this example, 5.5 ms. (2 ms.+2 ms.+1.5 ms.) is subtracted from the deactivation interval $T_I$ to determine the actual time that the data transmitter 102 is not drawing power from the power source 110. In this example, the deactivation interval $T_1$ must be at least 5.5 ms., and is preferably much greater.

The data transmitter 102, the processor 104, the buffer 108, and/or the other components shown in FIG. 1 may be part of a WLAN integrated circuit (chip) or other integrated circuit. A WLAN chip may include one or more of the following devices (not shown) in communication with one or more of the components shown in FIG. 1: a baseband processor (BBP), a media access control (MAC) device, a physical-layer (PHY) device, interfaces, firmware, other memory and/or processors, or any other system on chip (SOC) components. Other integration schemes for the components shown in FIG. 1 are contemplated and within the scope of the invention.

Figure 2:
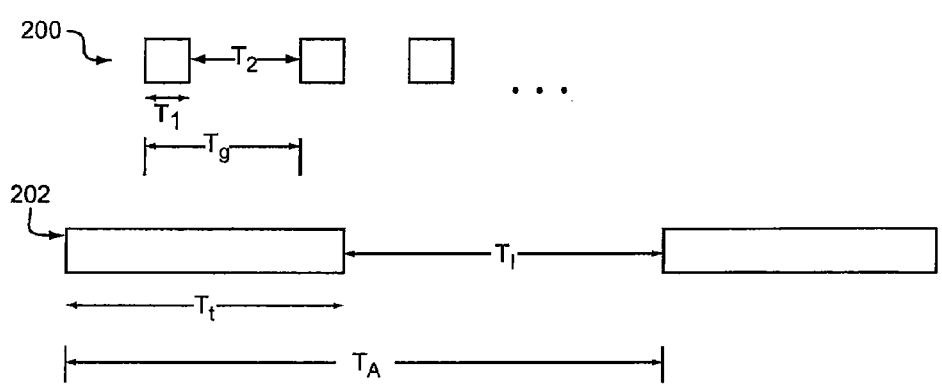
FIG. 2 illustrates a technique for determining a deactivation interval for the data signal transmitter of FIG. 1.

FIG. 2 illustrates a plurality of media data packets 200 that are aggregated into media data packet blocks 202 in the buffer 108. The size of each media data packet 200 corresponds to a transmission time $T_t$. $T_g$ refers to the time interval that would be required to transmit successive un-aggregated media data packets 200. $T_g$ thus also refers to the media data sampling rate, i.e., the data rate of the data source 106. In the example above, $T_g$=10 ms. $T_2$ refers to the interval that the data transmitter 102 is not transmitting any data (because the data transmitter 102 transmits at a higher rate ($T_1$) than $T_g$). $T_2$ is increased to $T_1$ because media data packets 200 are aggregated in the buffer 108, and then transmitted at the higher transmit rate of the data transmitter 102.

The following example provides values for the time periods discussed above. The example is provided to illustrate the principles of media-type data aggregation and is not to be interpreted as limiting the scope of the invention in any way. In this example, the data source 106 provides a 64-byte audio sample every 10 ms. Thus, $T_g$=10 ms. and the data rate of the data source 106 is 5.12 kbps. If ten packets are aggregated in the buffer 108 for each transmission, $T_A$=100 milliseconds. If the transmit rate is 256 kbps, $T_t$=20 milliseconds. Thus, $T_I$=80 ms. Assuming the processing and transition periods discussed above (5.5 ms.), the actual time that the data transmitter 102 is not drawing power from the power source 110 (i.e., the actual time that the data transmitter 102 is in a deactivated state) is 74.5 ms. In this example, the power consumed by the data transmitter 102 is reduced by 74.5%.

Figure 3:
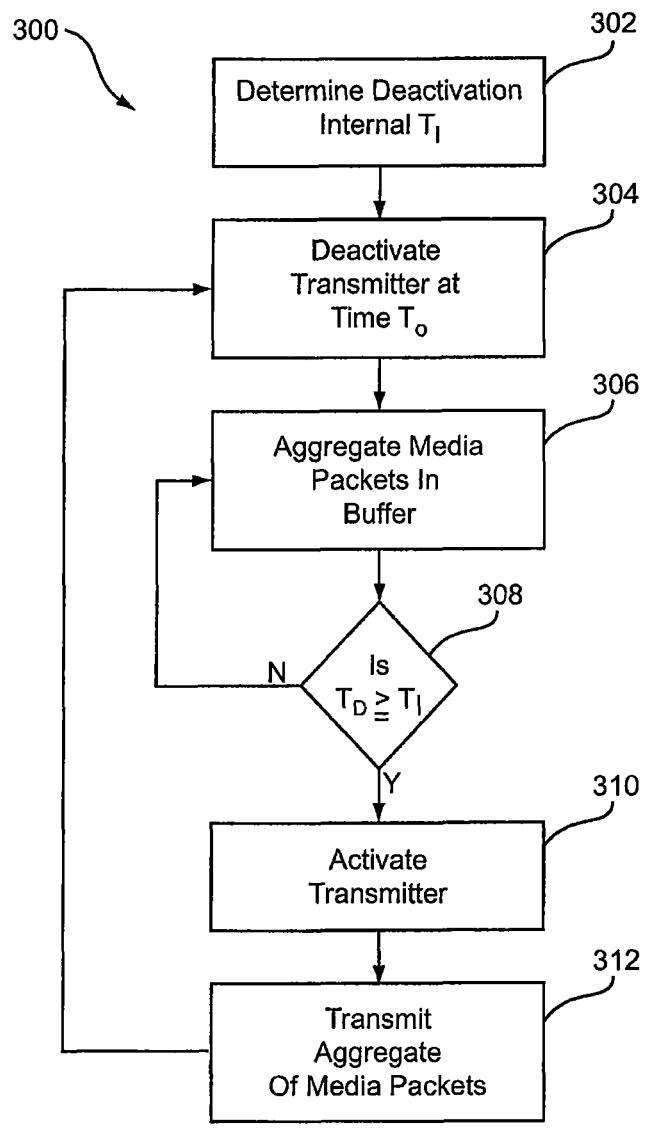
FIG. 3 shows acts for activating and deactivating a data signal transmitter in intervals, according to a disclosed embodiment.

FIG. 3 shows Acts 300 for activating and deactivating a data transmitter in intervals, according to an embodiment of the invention. A deactivation interval $T_I$ is determined (Act 302) for transmitting consistent-rate data, such as media data, received from a data source. The deactivation interval $T_I$ may be a predetermined deactivation interval or may be determined (by a processor or other device) based on the number of media data packets to be aggregated (without exceeding the capacity of an aggregation buffer or memory). The deactivation interval $T_I$ preferably allows a receiving device to continue to process the media data at the sampling rate. In other words, the deactivation interval $T_I$ preferably does not exceed the sampling rate multiplied by the number of media data packets that are aggregated in the buffer. The deactivation interval $T_I$ may be predetermined and communicated to a processor as a value and/or a processor may determine the deactivation interval $T_I$ based on one or more factors, such as the capacity of the buffer, the sampling rate, the number of media data packets that may be aggregated, or other factors.

The data transmitter is deactivated (Act 304). The start of the deactivation interval may be designated as $T_O$. Media data packets are aggregated in the buffer while the data transmitter is deactivated (Act 306). The media data packets continue to aggregate in the buffer if the real time deactivation interval $(T_D)<T_I$ (Act 308). If $T_D \geq T_I$, the data transmitter is activated (Act 310), and the aggregate of media data packets are transmitted (Act 312). The aggregate of media data packets may be transmitted in a Transmit Opportunity (TXOP) burst transmission, as an example. A TXOP is a bounded interval during which the transmitting device may transmit as many data packets (or multiplexed data packets) as possible. After the aggregate of data packets are transmitted, the transmitter may again be deactivated (return to Act 304).

Figure 4:
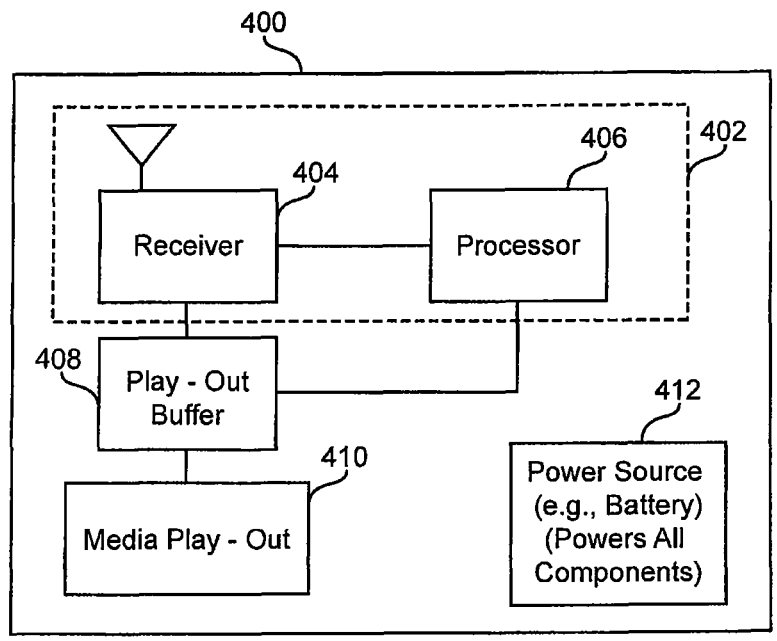
FIG. 4 illustrates a wireless device having a receiver circuit that transitions a wireless signal receiver to a sleep mode for an interval determined by the level of data in a play-out buffer, according to an embodiment of the invention.

Turning next to systems and methods for decreasing the amount of power consumed by a wireless signal receiver, FIG. 4 illustrates a wireless device 400 having a receiver circuit 402. The receiver circuit 402 reduces power consumption by transitioning a receiver 404 to a sleep mode for intervals that are defined by the level of data in a play-out buffer 408. Sleep mode is a power saving mode and refers to either completely or partially disabling the receiver 404 so that it draws less power from the power source 412.

The device 400 may be any type of wireless device such as a lap-top computer, personal digital assistant, multi-media Internet enabled phone, portable media player, a device operable in a wireless local area network (WLAN) or other network, or any other device having a receiver circuit 402 and a power source 412. The receiver circuit 402 may be a WLAN interface chip, an application specific integrated circuit, or other circuit or system having or in communication with the receiver 404, as examples.

The receiver 404, a processor 406, the play-out buffer 408, and/or the other components shown in FIG. 4 may be part of a WLAN integrated circuit (chip) or other integrated circuit. A WLAN chip may include one or more of the following devices (not shown) in communication with one or more of the components shown in FIG. 4: a baseband processor (BBP), a media access control (MAC) device, a physical-layer (PHY) device, interfaces, firmware, other memory and/or processors, or any other system on chip (SOC) components. Other integration schemes for the components shown in FIG. 4 are contemplated and within the scope of the invention.

The receiver 404 receives data packets from a transmitting device (not shown). The receiver circuit 402 reads media data from the received data packets and communicates the media data to the play-out buffer 408. A media play-out device 410 receives the media data from the play-out buffer 408 at a media play-out rate and communicates media signals to a play-out component such as a speaker or display (not shown).

In the illustrated embodiment, the receiver 404 and the play-out buffer 408 are in communication with the processor 406. The processor 406 monitors the level of data buffered in the play-out buffer 408. When the level of data in the play-out buffer 408 is greater than or equal to a first threshold (high watermark level), the processor 406 communicates a message to a data transmitter (which may be the receiver 404 if the receiver 404 is a transceiver) to send a message to the transmitting device to stop transmitting data packets. The processor 406 also communicates a signal to the receiver 404 to transition it to sleep mode.

While the receiver 404 is in sleep mode, the processor 406 continues to monitor the level of media data buffered in the play-out buffer 408. The level of media data in the play-out buffer 408 will decrease as it is communicated to the media play-out device 410. When the level of data in the play-out buffer 408 is less than or equal to a second threshold (low watermark level), the processor 406 communicates a signal to the receiver 404 to transition to an active state. The processor 406 also communicates a message to the data transmitter (which, again, may be the receiver 404 if the receiver 404 is a transceiver) to send a message (transmit message) to the transmitting device to resume data packet transmissions. The receiver circuit 402 may (optionally) implement any additional power saving technique while activated to receive data packets. Exemplary optional power saving techniques include the IEEE Power Save for Infrastructure Mode, the IEEE Power Save for Independent Basic Service Set (IBSS) Mode, and the IEEE 802.11 Automatic Power Save Delivery (APSD) power save technique.

While the receiver 404 is in sleep mode, the transmitting device (which is in communication with the media data source) may buffer media data packets in a transmit buffer. The transmitting device may implement the power saving technique discussed above with reference to FIGS. 1-3 or may implement any other technique to temporarily cease data transmissions intended for the receiver 404. When the transmitting device receives the transmit message from the device 400, it transmits the buffered media data packets. The transmitting device may transmit the buffered media data packets in a Transmit Opportunity (TXOP) burst transmission, as an example.

In the embodiment shown in FIG. 4, the power saving technique is implemented as an asynchronous event of the receiver circuit 402, meaning that the receiver circuit 402 determines when to go into the sleep mode independent of the transmitting device. The transmitting device follows the instructions (to transmit or not transmit data packets) contained in the messages from the receiving device 400. It is noted that the transmitting device may implement the power saving technique discussed above with reference to FIGS. 1-3 as an asynchronous event if the receiving device 400 does not implement the power saving technique discussed herein. Also, the transmitting device may implement the power saving technique discussed above with reference to FIGS. 1-3, and may communicate with a receiving device 400 that implements the power saving technique discussed with reference to FIGS. 4-6. However, in this case, the power saving technique implemented by the transmitting device is not asynchronous and may require modification to account for the dependence on the transmit control messages (to transmit or not transmit data) received from the receiving device 400.

Figure 5:
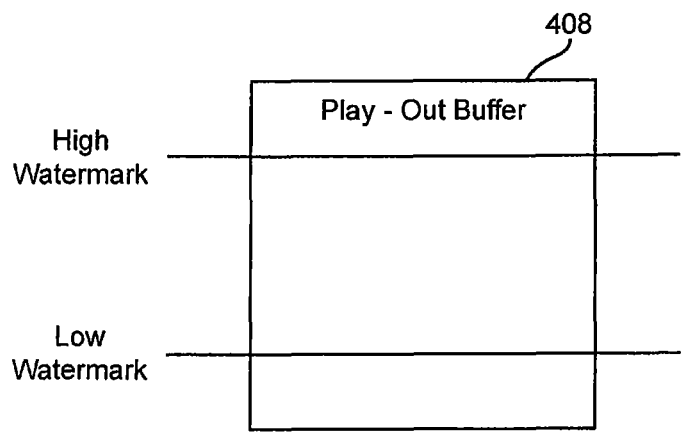
FIG. 5 illustrates a technique for determining whether to transition the wireless signal receiver of FIG. 4 into or out of sleep mode, according to an embodiment of the invention.

FIG. 5 illustrates the high and low watermark levels discussed above for the play-out buffer 408. The high watermark may be programmed in the receiver circuit 402 as a predetermined value and/or the receiver circuit 402 may be programmed to determine the high watermark. Whether predetermined or programmable, the high watermark is limited by the capacity of the play-out buffer 408. The high watermark may optionally additionally account for a user's perception of the initial play-out delay (i.e., waiting for the play-out to begin) that occurs between the time a user requests playback and when the media data reaches the high watermark in the play-out buffer 408. If it is desired to have a shorter initial play-out delay, the high watermark level may be set at a relatively lower level.

The low watermark may be programmed in the receiver circuit 402 as a predetermined value and/or the receiver circuit 402 may be programmed to determine the low watermark. Whether predetermined or programmable, the low watermark preferably factors into account the sampling period of the media data. For example, if the sampling period is 10 ms. the receiver circuit 402 must be activated in time to receive a media data packet from the transmitting device within 10 ms. of the play-out buffer having communicated its last media data sample to the media play-out device 410. This will ensure continuous media play. In addition, the low watermark may also account for the wake-up latency of the receiver circuit 402 and include a margin to account for possible wireless jitter and retransmission requests. The low watermark may take into account other timing constraints.

Figure 6:
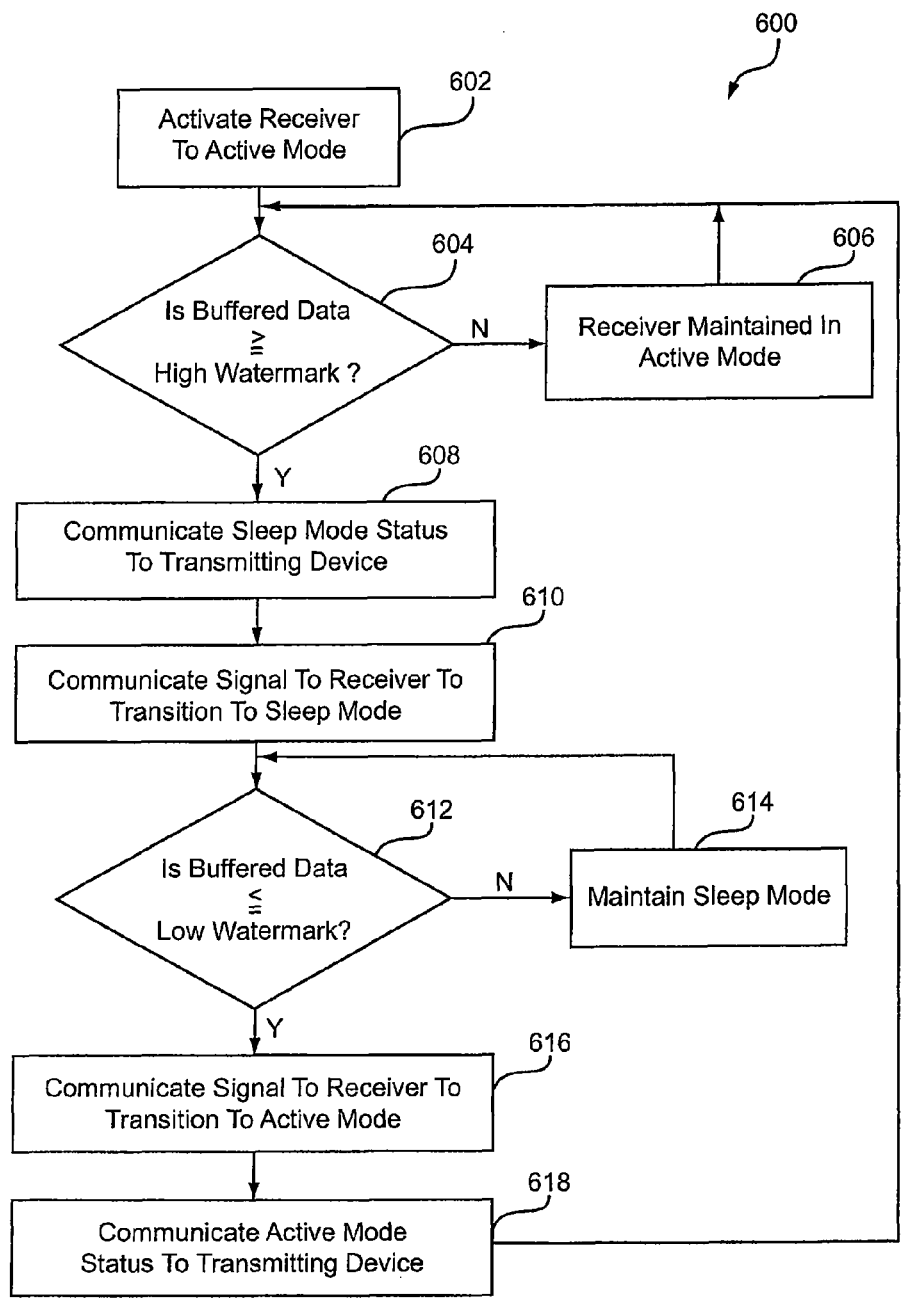
FIG. 6 shows acts for transitioning a wireless signal receiver into and out of sleep mode, according to an embodiment of the invention.

FIG. 6 shows Acts 600 for transitioning a data receiver into and out of sleep mode, according to an embodiment of the invention. The Acts 600 may be implemented by hardware, firmware and/or software that comprise the receiver circuit 402 or other circuit, as examples. The data receiver is activated (Act 602) to active mode to receive media data packets via a wireless signal from a transmitting device, and communicate media data to a memory. The level of media data accumulated in the memory is monitored (Act 604). The receiver is maintained in active mode if the level of accumulated media data is less than a high watermark (Act 606). When the level of media data reaches or exceeds the high watermark, acts are executed to enter sleep mode: a first signal is communicated to the receiving device's transmitter (which may be included in the receiver if the receiver comprises a transceiver). The first signal causes the transmitter to transmit a message to the transmitting device to stop transmitting the media data packets (Act 608); a second signal is communicated to the receiving device's receiver to cause it to transition to sleep mode (Act 610). The second signal may be the same as the first signal or may be a separate signal.

The level of media data in the memory is monitored (Act 612) as the media file is played. The receiver is maintained in sleep mode while the level of media data in the memory is greater than a low watermark (Act 614). When the level of media data falls to or below the low watermark, acts are executed to transition the data receiver to active mode: a first signal is communicated to the receiver to transition the receiver to active mode (Act 616); a second signal is communicated to a transmitter (which may be the receiver if the receiver comprises a transceiver) to send a message to the transmitting device to resume data transmissions (Act 618). The acts may return to Act 604, as illustrated.

All of the discussion above, regardless of the particular implementation being described, is exemplary in nature, rather than limiting. Although specific components of the transmission circuit 112 and the receiver circuit 402 are described, methods, systems, and articles of manufacture consistent with the transmission circuit 112 and the receiver circuit 402 may include additional or different components. For example, components of the transmission circuit 112 and/or the receiver circuit 402 may be implemented by one or more of: control logic, hardware, a microprocessor, microcontroller, application specific integrated circuit (ASIC), discrete logic, or a combination of circuits and/or logic. Further, although selected aspects, features, or components of the implementations are depicted as hardware or software, all or part of the systems and methods consistent with the transmission circuit 112 and/or the receiver circuit 402 may be stored on, distributed across, or read from respective machine-readable media, for example, secondary storage devices such as hard disks, floppy disks, and CD-ROMs; a signal received from a network; or other forms of ROM or RAM either currently known or later developed. Any act or combination of acts may be stored as instructions in computer readable storage medium. Memories may be DRAM, SRAM, Flash or any other type of memory. Programs may be parts of a single program, separate programs, or distributed across several memories and processors.

The processing capability of either system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs and rule sets may be parts of a single program or rule set, separate programs or rule sets, or distributed across several memories and processors.

It is intended that the foregoing detailed description be understood as an illustration of selected forms that the invention can take and not as a definition of the invention. It is only the following claims, including all equivalents, that are intended to define the scope of this invention.

What is claimed is:

1. An apparatus comprising:
a wireless signal receiver that includes a radio frequency (RF) input section coupled to an antenna, wherein the wireless signal receiver is configured to communicate data received via the antenna to a memory; and
a processor configured to determine whether a level of data buffered in the memory is at or below a threshold, when the level of data buffered in the memory is at or below the threshold, the processor is configured to transition at least the RF input section to an active mode,
when the level of data buffered in the memory is above the threshold, the processor is configured to transition the RF input section to a power saving mode, wherein the wireless signal receiver is inactive in the power saving mode.

2. The apparatus of claim 1, wherein the processor is configured to:
deactivate the RF input section if the level of data buffered in the memory
reaches a first threshold, and
activate the RF input section if the level of data buffered in the memory reaches a second threshold.

3. The apparatus of claim 1, wherein the processor and the wireless signal receiver comprise a receiver circuit, and the receiver circuit communicates a signal to a transmitting device indicating whether the transmitting device is to stop transmitting data signals, wherein the RF input section is activated and deactivated asynchronously with respect to the transmitting device.

4. The apparatus of claim 1, further comprising a media play-out device to read media data from the memory, wherein the level of data buffered in the memory decreases as media data is read from the memory while the RF input section is in the power saving mode, and the processor transitions the RF input section to the active mode when the level of data buffered in the memory decreases to a first threshold.

5. The apparatus of claim 4, wherein the level of data buffered in the memory increases as media data is written to the memory while the RF input section is in the active mode, and the processor transitions the RF input section to the power saving mode when the level of data buffered in the memory increases to a second threshold.

6. The apparatus of claim 1, wherein the processor:
monitors the level of data buffered in the memory; and
communicates a first signal and a second signal if the level of data reaches a first threshold,
wherein the first signal corresponds to a first message to a transmitting device to stop transmitting data signals for receipt by the RF input section, and the second signal transitions the RF input section to the power saving mode.

7. The apparatus of claim 1, wherein the processor:
communicates a first and a second signal if the level of data reaches a second threshold, wherein the first signal transitions the RF input section to the active mode, and the second signal corresponds to a second message to a transmitting device to transmit data signals for receipt by the RF input section.

8. A method comprising:
communicating data to a memory; and
determining, by a processor, whether to transition a radio frequency (RF) input section of a wireless signal receiver between a power saving mode and an active mode based on a level of data buffered in the memory, wherein during the power saving mode, at least the RF input section is at least partially disabled so that it draws less power than in the active mode.

9. The method of claim 8, further comprising:
deactivating the RF input section if the level of data buffered in the memory reaches a first threshold; and
activating the RF input section if the level of data buffered in the memory reaches a second threshold.

10. The method of claim 8, further comprising communicating a signal to a transmitting device indicating whether the transmitting device is to stop transmitting data signals for receipt by the RF input section.

11. The method of claim 8, further comprising:
reading media data from the memory to decrease the level of data buffered in the memory; and
activating the RF input section to the active mode when the level of data buffered in the memory decreases to a first threshold.

12. The method of claim 11, further comprising:
writing media data to the memory to increase the level of data buffered in the memory; and
transitioning the RF input section to the power saving mode when the level of data buffered in the memory increases to a second threshold.

13. The method of claim 8, further comprising:
monitoring the level of data buffered in the memory; and
communicating a first and a second signal if the level of data reaches a first threshold,
wherein the first signal corresponds to a first message to a transmitting device to stop transmitting data signals for receipt by the RF input section, and the second signal transitions the RF input section to the power saving mode.

14. The method of claim 8, further comprising communicating a first and a second signal if the level of data reaches a second threshold, wherein the first signal transitions the RF input section to the active mode, and the second signal corresponds to a second message to the transmitting device to resume transmitting data signals for receipt by the RF input section.

15. An apparatus comprising:
a wireless signal receiver that includes a radio frequency (RF) input section coupled to an antenna; and
a receiver circuit to transition the RF input section between a first mode and a second mode, wherein in the first mode the receiver circuit enables the RF input section to receive data signals and communicate received data to a memory, and in the second mode the receiver circuit disables the RF input section to reduce power consumption, monitors a level of data in the memory, and transitions the RF input section back to the first mode if the level of data in the memory is less than a first threshold.

16. The apparatus of claim 15, wherein the receiver circuit transitions the RF input section to the second mode if the level of data in the memory is greater than a second threshold.

17. The apparatus of claim 15, wherein the receiver circuit communicates a signal to a transmitting device, the signal indicating whether the RF input section is able to receive the data signals.

18. The apparatus of claim 15, wherein the received data includes media data.

19. A method comprising:
determining a data level in a memory;
enabling a radio frequency (RF) input section of a wireless receiver to receive data signals and communicate received data to the memory if the data level reaches a first threshold; and
disabling the RF input section of the wireless receiver if the data level reaches a second threshold.

20. The method of claim 19, further comprising communicating a signal to a transmitting device, the signal indicating whether the RF input section is able to receive the data signals.

21. The method of claim 19, wherein the received data includes media data.

22. An apparatus comprising:
a memory; and
a wireless signal receiver that includes a radio frequency (RF) input section in communication with the memory, wherein the RF input section transitions to a power saving mode if a data level in the memory reaches a first threshold, and transitions to an active mode if the data level reaches a second threshold, wherein the first threshold is greater than the second threshold, wherein during the power saving mode, at least the RF input section is disabled so that it draws less power.

23. The apparatus of claim 22, further comprising a processor to transition the RF input section between the power saving mode and the active mode based on the data level.

* * * * *